(No Model.)

H. MACKLEY & J. B. ROSS.
NON SIPHONING ATTACHMENT FOR CLOSET AND OTHER TRAPS.

No. 321,829. Patented July 7, 1885.

Witnesses:
W. S. Baker
M. M. Gridley

Inventors:
Henry Mackley,
Joseph B. Ross,
per Gridley & Fletcher,
Attorneys.

United States Patent Office.

HENRY MACKLEY AND JOSEPH B. ROSS, OF CHICAGO, ILLINOIS.

NON-SIPHONING ATTACHMENT FOR CLOSET AND OTHER TRAPS.

SPECIFICATION forming part of Letters Patent No. 321,829, dated July 7, 1885.

Application filed October 7, 1884. (No model.)

*To all whom it may concern:*

Be it known that we, HENRY MACKLEY and JOSEPH B. ROSS, of Chicago, in the county of Cook and State of Illinois, have invented a new, useful, and Improved Non-Siphoning Attachment for Closet and other Traps, of which the following is a full, clear, and exact description, reference being had to the accompanying drawings, in which—

Figure 1:
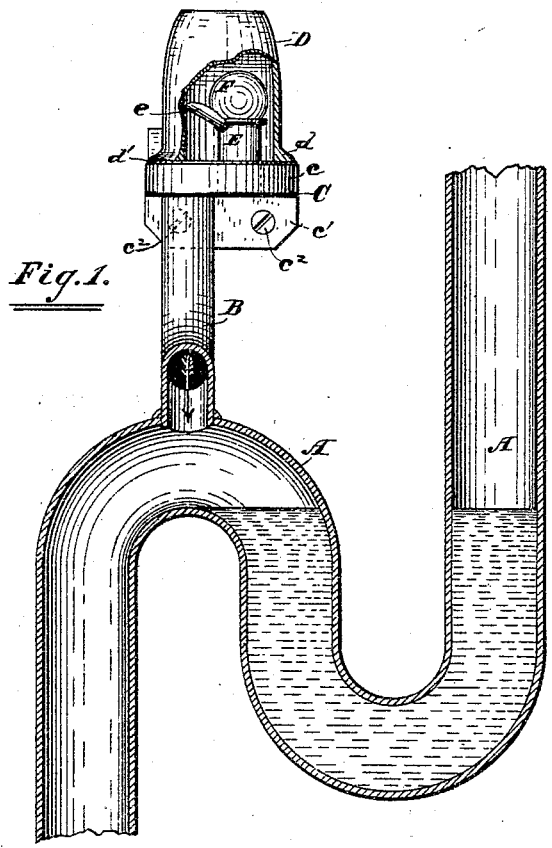
Figure 2:
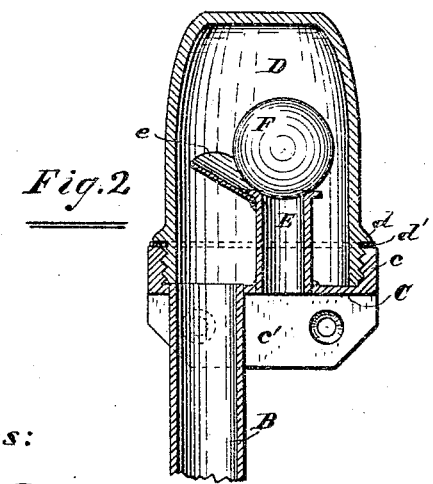

Figure 1 is a longitudinal vertical sectional view of an ordinary closet-trap with our improved attachment connected therewith, the same appearing in elevation with a part broken away to show the ball within; and Fig. 2 is a central vertical sectional view of said attachment.

Like letters of reference indicate like parts in the different figures.

The object of our invention is to produce a device which may be attached to or connected with closet and other traps, and which may be so acted upon by the suction or pressure of air or gas in sewer, soil, and waste pipes as to cause a sufficient influx of air from without to relieve said pressure and thus prevent siphoning in the traps of said pipes, the action of said attachment being wholly automatic, and regulated by said suction or pressure, said device being further especially designed to permit the free admission of air, while at the same time a backward or outward flow of gas or liquid may be wholly and effectually prevented. We accomplish said object by attaching preferably to the top of said trap a suitable pipe, the opposite end of which is connected with a bell-glass or other receptacle containing an orifice or induction-pipe, over which is placed a loose ball or valve, the extremity or opening of the said induction-pipe being preferably above the bottom of said receptacle, and provided with a suitable flange or other suitable means to prevent said ball from being wholly displaced when moved by an influx of air, all of which will be hereinafter more fully described, and definitely pointed out in the claim.

In the drawings, A represents the usual trap of a waste or soil pipe, to the top of which we solder or otherwise connect a pipe, B, substantially as shown. Upon the opposite end of said pipe B is rigidly secured a plate, C, provided with an upwardly-projecting annular flange, $c$, having a screw-thread thereon, by which means may be rigidly secured to said plate C a bell glass or cap, D, having a corresponding screw-thread and a flange or shoulder, $d$, between which and said flange $c$ is inserted rubber or other packing $d'$, Fig. 2, thus making an air-tight joint.

The pipe B may be of any length, and the attachment upon its upper end placed in any position desired; but it is important that the same should be above the top of said trap.

In order to sustain said attachment and prevent a possible injury to said trap from a movement thereof, we prefer to secure said attachment to the wall or other support by means of a flange or plate, $c'$, rigidly secured to the plate C, through which screws $c^2 c^2$ may be inserted for said purpose. An induction-pipe, E, open at the bottom and top, is rigidly and permanently secured to the plate C, and caused to project upward above the same and within said bell glass or cover, substantially in the manner shown, upon the top of which we preferably place a rubber ball, F, somewhat larger than the orifice in said pipe, and which is intended to act as a loose valve thereover.

To provide against leakage in case of a stoppage below the trap, in which case the liquid might rise in the bell-glass and cause the ball to float, we prefer to weight said ball sufficiently so that it may remain securely upon its seat in such an event. Said weighting may be accomplished by placing shot or a ball of lead within said ball.

In order to prevent said ball from being wholly displaced from its seat thereon, a flange, $e$, may be secured to the pipe E over the opening of said pipe B, said flange being made slanting, as shown, so that it may cause the ball F to roll back upon its seat when displaced. Any other device may be adopted for accomplishing said result without deviating from the essential features of our invention.

The operation of said attachment is as follows: Upon a downward suction below the trap A, such as might ordinarily tend to cause the water therein to be siphoned out, a corresponding downward suction is produced in the pipe B, as indicated by the arrow shown at the outlet thereof in Fig. 1. This causes an upward current of air through the eduction-pipe E, which raises the ball F, and at once equalizes the pressure in said trap. As soon as an equilibrium is thus produced the ball resumes its normal position upon the seat, and effectually prevents an escape of gas or liquid, it being manifest that the greater the backward pressure the more closely said ball or valve is caused to fit in position.

Said attachment may vary in size in proportion to the size of the pipe or trap to which it is applied, and by means thereof we are enabled to ventilate soil, sewer, and waste pipes in a more satisfactory manner than has heretofore been accomplished, for the reason that it cannot be affected by frost, as is the case with ventilating-pipes which are carried out of doors.

While we prefer to make the cover D of glass, in order that the interior may be inspected without removing said top, yet a cover of any other material may be used with equal advantage in other respects.

We are aware that attachments have been made to traps and sewers whereby an influx of air is permitted to flow through a hinged or reciprocating valve to equalize the pressure within the pipe or trap, a backward pressure being prevented by the closing of said valve. We are also aware that a bell-glass has been used in traps to permit an inspection of the interior, and we do not claim, broadly, either of these features.

What we do claim is—

In combination with the trap A, having the upwardly-extending inlet-pipe B, the horizontal plate C, having the vertical screw-threaded flange c and wall-flange c', secured on the upper end of said pipe B in such manner that the end of said pipe may pass through said plate, pipe E, secured at its lower end to said plate on its upper side in such manner that its lower end passes through said plate at one side from pipe B, and having the valve-guard e, secured to its upper end, ball-valve F, bell-glass D, having the annular flange d, and having its lower end screw-threaded to unite it with plate C, and washer d', all arranged to operate as and for the purpose set forth.

HENRY MACKLEY.
JOSEPH B. ROSS.

Witnesses:
D. H. FLETCHER,
M. M. GRIDLEY.